United States Patent

[11] 3,577,810

| [72] | Inventor | Otto Eckle |
| | | Lochgau, Germany |
| [21] | Appl. No. | 806,572 |
| [22] | Filed | Mar. 12, 1969 |
| [45] | Patented | May 4, 1971 |
| [73] | Assignee | Firma Komet Stahlhalter-Und Werkzeugfabrik, Robert Breuning-G.m.b.H. |
| | | Neckar, Germany |
| [32] | Priority | Mar. 20, 1968 |
| [33] | | Germany |
| [31] | | P 17 52 014.8 and P 17 52 012.6 |

[54] BORING BAR INSERT
8 Claims, 6 Drawing Figs.

[52] U.S. Cl................................................ 408/162
[51] Int. Cl............................................. B23b 29/034
[50] Field of Search............................... 77/58, 58.3,
58.36, 58.37, 58.38

[56] References Cited
UNITED STATES PATENTS
3,309,946   8/1970   Thomas...................... 77/58

*Primary Examiner*—Gerald A. Dost
*Attorney*—Woodhams, Blanchard and Flynn

ABSTRACT: A boring bar insert having two counterwise movable boring tool carriers, the tools of which are arranged at oppositely actuated ends of the boring tool carriers when rotated through 180° to one another. For counterwise movement and adjustment of the boring tool carriers there is between their mutually facing shank ends an adjusting ring cooperating with two counterwise screwthreads of the boring tool carriers and a centering device. The boring tool holders are securely held and also can be moved counterwise in the clamped condition. Centering of the boring tool carriers with respect to the boring bar axis is possible.

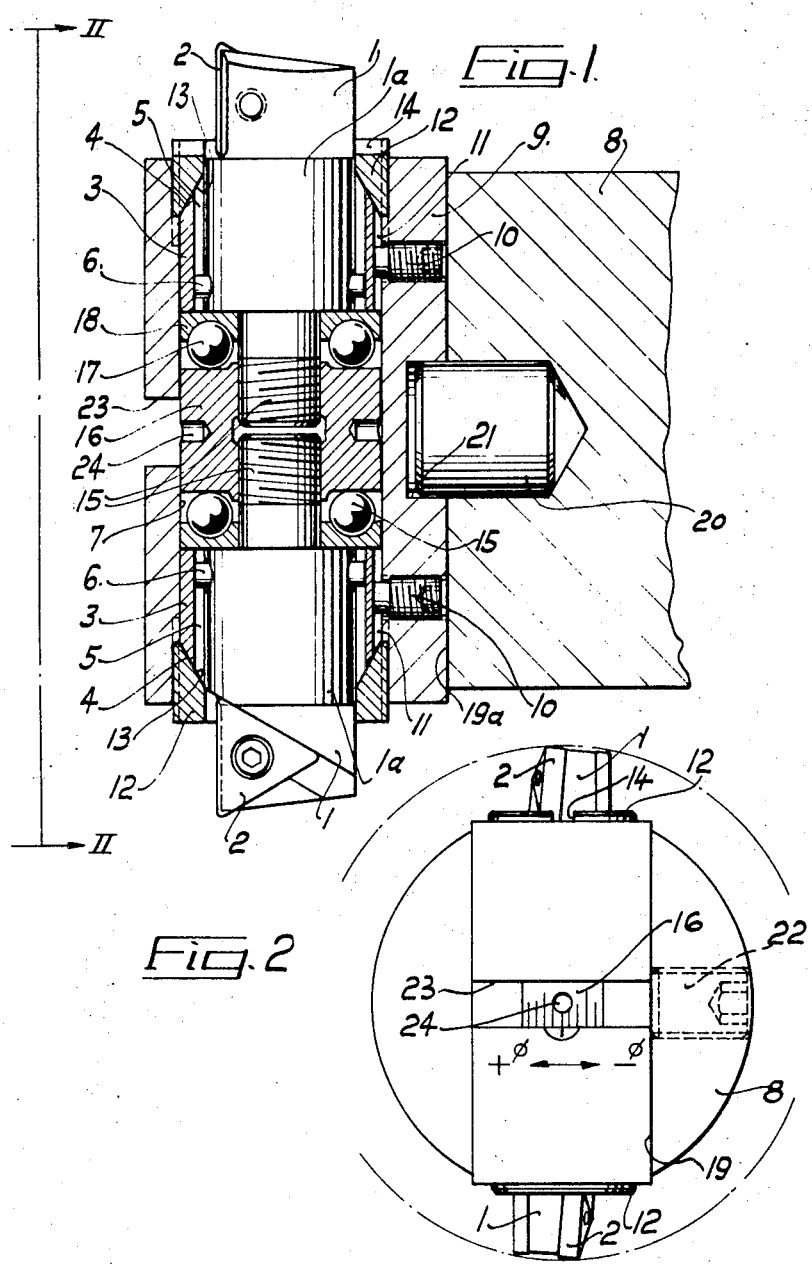

Patented May 4, 1971
3,577,810
3 Sheets-Sheet 2
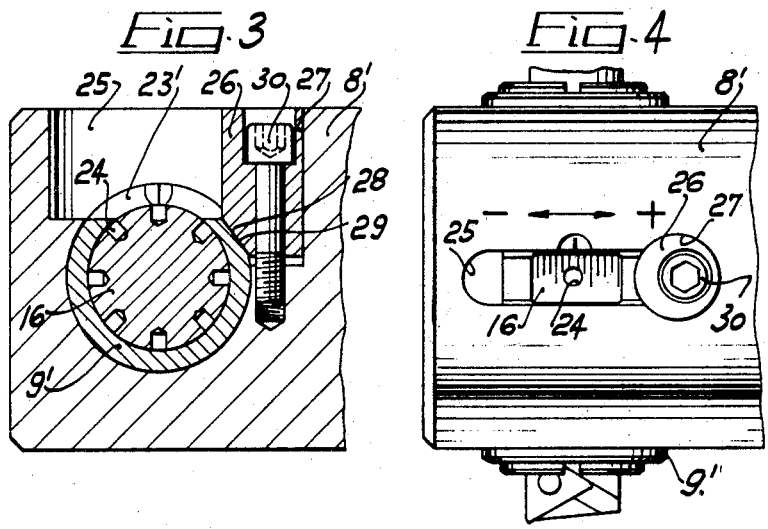
INVENTOR.
OTTO ECKLE
BY
Woodhams, Blanchard & Flynn
ATTORNEYS

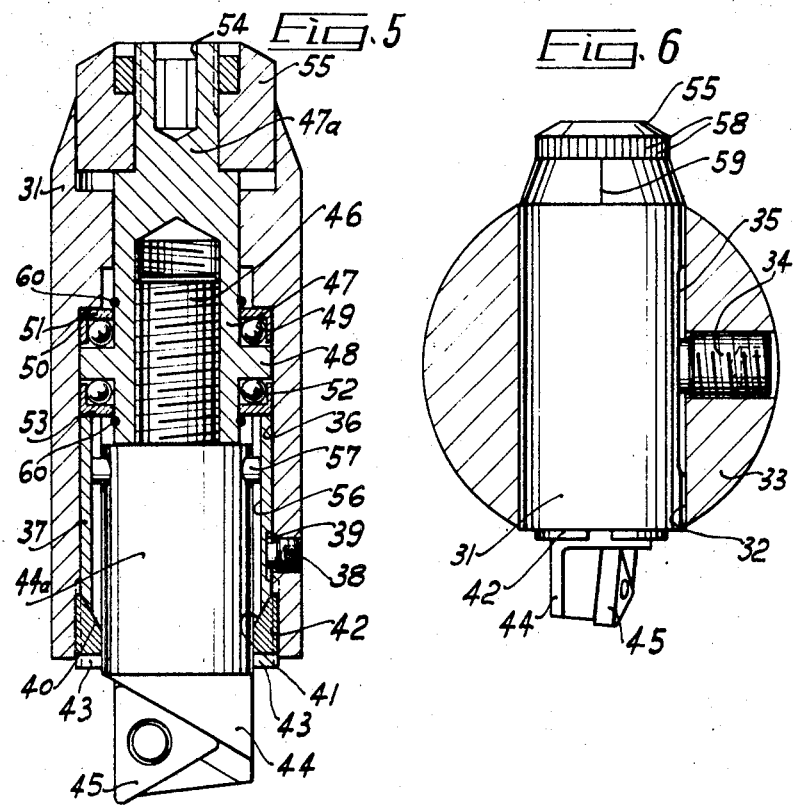

BORING BAR INSERT

The invention relates to a boring bar insert, particularly one having two counterwise movable boring tool carriers, the boring tools of which, rotated through 180° to one another, are arranged at oppositely situated ends of the boring tool carriers, in which, for the counterwise movement and adjustment of the boring tool carriers, there is provided between their mutually facing shank ends, an adjusting ring cooperating with two counterwise screw threads of the boring tool carriers, and a centering device is provided between boring bar and insert.

In one such known boring bar insert, the boring tool carriers have a square cross section. The adjusting ring has on its periphery an annular groove with prismatic cross section and is provided on both end faces with screw-threaded studs, the screw threads of which run counterwise. These screw-threaded studs engage corresponding counterwise screwthreads of the shank ends. In the boring bar itself a centering screw with conical head is provided, which engages the prismatic groove of the adjusting ring. The boring bar insert may thereby be centered with respect to the boring bar axis. By rotation of the adjusting ring, the boring tool carriers are adjusted simultaneously radially counterwise outwardly or inwardly, whereby the machining diameter may be varied. By means of such a boring bar insert, equipped with two diametrically opposite boring tools, the machining time is said to be reduced to about half, without loss of accuracy or surface quality. This is based on the idea that the two boring tools, provided their cutting tips lie in a common plane of rotation, for a certain feed per revolution, always remove only one chip thickness corresponding to half the feed distance. If the chip thickness, which has been found to be effective in obtaining a certain surface quality in the case of a single-acting boring tool, is retained, then in a boring tool of the present kind having two cutting edges, for constant surface quality, the feed may be doubled and hence the machining time, excluding the setting-up and infeed times, may be halved.

The known boring tool insert, however, has disadvantages with regard to the mounting of the boring tool carriers and the centering of the boring tools in relation to the boring bar axis. Mounting and clamping of the boring tool carriers in the boring bar is affected exclusively by means of the centering screw engaging the prismatic groove. If the boring bar carriers do not fit the recess of the boring bar with the utmost accuracy, they can vibrate resulting in impairment of the surface quality and in shortening of the edge life of the boring tools. This occurs in particular if the workpiece has different machining offsets or if, on starting to cut or on leaving the bore, there is no plane surface available. In addition, the threads of the screw-threaded studs of the adjusting ring suffer very considerably by one-sided loading of this adjusting ring. Furthermore, centering by means of the prismatic groove provided in the adjusting ring is very problematic, since it requires special measures in making the boring bar insert. As is known, each screw thread has only one start. If the two boring tool carriers are to have exactly the same distance from the prismatic groove, not only must the thread start of the screw-threaded studs provided on the adjusting ring be arranged exactly symmetrically, but the same also applies to the thread starts of the boring tool carriers. In addition, the distance from the thread start of the boring tool carrier to the cutting tip of the boring tool, even in the two boring tools, must then again be exactly the same. This requires considerable machining accuracy in making the known boring bar insert. If it is impossible to adhere to this machining accuracy the machining accuracy of the finished insert also suffers thereby.

The present invention is based on the problem of providing a boring bar insert of the aforementioned type in which, on the one hand, the boring tool carriers are securely held and also can be moved counterwise in the clamped condition, and on the other hand exact centering of the boring tool carriers with respect to the boring bar axis is possible. This is achieved according to the invention in that:

a. the boring tool carriers have a cylindrical shank and are each nonrotatably guided in a collet chuck sleeve having a cone on its outer end, b. both sleeves are slidably nonrotatably guided in a throughgoing longitudinal bore of a housing insertable in the boring bar, c. screw-threaded rings are screwed in on both ends of the longitudinal bore and cooperate by their inner cone with the collet chuck sleeve, d. between each of the inner ends of the collet chuck sleeves and the adjusting ring, slidable in the longitudinal bore, there is provided an axial bearing, on which the collet chuck sleeve is supported by the effect of the axial force produced by the screw-threaded ring, and e. the centering device is provided between the housing and the boring bar.

This new boring bar insert has various advantages. Due to the screw-threaded rings, cooperating with the collet chuck sleeves and screwed in the longitudinal bore, the boring tool carriers are guided in the housing completely free from play and with adjustable clamping effect. The boring tool carriers are therefore mounted in the housing free from play and vibration. Due to the axial bearing, the boring tool carriers may be moved counterwise to-and-fro also in the clamped condition. Without slackening the screw-threaded rings, therefore, accurate adjustment of the machining diameter may be effected. The machining diameter, once adjusted, cannot alter, since after the adjustment, the screw-threaded rings, already in the clamping position, do not have to be actuated further. By means of these screw-threaded rings, however, accurate centering of the boring tool carriers with regard to the housing or the boring bar itself is also possible. For this reason, the centering device provided between housing and boring bar may be kept very simple, it may for example consist of a stud engaging a corresponding cross groove in the housing. If, now, after fitting the boring bar insert, it is found that the boring tools are at different distances from the boring bar axis, it is possible, by slackening one clamping ring and tightening the second clamping ring, to move the boring tool carriers including the adjusting ring axially in the longitudinal bore. The possibly already adjusted machining diameter is not thereby altered in any way. After tightening one of the two screw-threaded rings, all the parts of the boring bar insert are again tightened, free from play with regard to each other both in the axial direction and in the radial direction. The advantage of altering the centering by means of the screw-threaded rings also makes it possible to use so-called turn-round plates. As boring tools on the boring tool carriers. Even if these turn-round plates have different dimensions through repeated grinding, the boring tool carriers, including the turn-round plates, may be recentered, so that the cutting tips of the turn-round plates have the same distance from the boring bar axis.

If the adjusting ring is provided with an adjusting scale, in which case the housing must be provided with a central opening, so that the adjusting scale will be visible and the adjusting ring accessible, exact adjustment of the machining diameter may be made with an accuracy of some thousandths of a millimeter not only in the dismounted state of the boring bar insert, but also when the insert is in the boring bar.

Further advantages and details of the invention are described more particularly in the following with reference to embodiment examples shown in the accompanying drawings, in which:

FIG. 1 shows a longitudinal section through the new boring bar insert and boring bar;

FIG. 2 shows an end view seen in the direction II–II of FIG. 1;

FIG. 3 shows a longitudinal section through a second embodiment example rotated through 90° with respect to the first longitudinal section;

FIG. 4 shows a plan of FIG. 3;

FIG. 5 shows an axial section through a third embodiment example;

FIG. 6 shows a cross section through this embodiment example.

In the drawings, 1 denotes the boring tool carriers which on their ends turned away from each other carry the expediently interchangeable boring tools 2, advantageously constructed as turn-round plates. The boring tool carriers each have a cylindrical shank 1a and are nonrotatably guided in a collet chuck sleeve 3, having a cone 4 at its end. For this purpose, each of the collet chuck sleeves 3 has, for example, two longitudinal grooves 5 engaged by pins 6 let into the shank 1a. The collet chuck sleeve itself is also provided in its conical part and in an adjoining part with longitudinal slits permitting radial deformation of the collet chuck sleeve. Both collet chuck sleeves are nonrotatable but slidable in a throughgoing longitudinal bore 7 of a housing 9 insertable in the boring bar 8. Rotation of the sleeves 3 relative to the housing 9 is prevented by screw-threaded pins 10 which engage the longitudinal grooves 11 of the collet chuck sleeves by means of suitable studs. At both ends of the longitudinal bore 7, screw-threaded rings 12 are screwed in and their inner cone 13 cooperates with the cone 4 of the collet chuck sleeves, the core diameter of the screw-threaded rings being equal to or greater than the diameter of the longitudinal bore 7. For actuation of the screw-threaded rings, the latter have suitable recesses 14 in their end faces.

On their mutually facing ends, the shanks 1a are each provided with a screw-threaded stud 15, these two screw-threaded studs having counterwise screw thread These counterwise threads engage a corresponding screw thread of the adjusting ring 16. Between the end faces of the adjusting ring, which faces in this case are hardened, and the inner ends of the collet chuck sleeves 3 there is provided in each case an axial bearing 17, advantageously constructed as antifriction bearing, more particularly a ball bearing. The collet chuck sleeve 3 is supported in this case on the bearing rings 18. For receiving the housing 9 in the boring bar 8, the latter is provided with a recess 19 which in the embodiment example shown in FIGS. 1 and 2 is rectangular to correspond with the rectangular housing. The recess 19 is open on the end side of the boring bar. There is provided on its vertical lateral face 19a a cylindrical centering stud 20 engaging a corresponding centering groove 21 in the housing. The stud 20 in conjunction with the centering groove 21 serves for centering the housing 9 in the boring bar. For clamping tight, one or more setscrews 22 may be provided, as shown in FIG. 2.

As will be clear from FIGS. 1 and 2, the housing 9 in the region of the adjusting ring 16 also has an opening 23 extending transversely of the longitudinal bore 7, and the adjusting ring itself is provided with a number of radial bores 24. These radial bores 24 serve for the insertion of an actuating pin, not shown, which may be inserted through the opening 23. Since, at the same time, the recess 19 in the boring bar 8 is open to the front, adjustment of the adjusting ring by means of the said actuating pin may also be effected with the insert fitted. Advantageously, the adjusting ring 16 is provided on its periphery with an adjusting scale cooperating with a zero mark on the housing. It is thus possible to read off to an accuracy of a few thousandths of a millimeter adjusting movements of the adjusting ring producing a radial displacement of the boring tool carriers.

Instead of having a recess open to the front of the boring bar, an opening closed at the front may also be provided. In such a case, however, the centering device would have to be constructed somewhat differently. It could, for example, consist in known manner of a conical countersunk recess in the housing, which recess would cooperate with a screw having a conical head. For adjustment of the boring tool carriers to be possible also with the insert fitted, the boring bar must be provided with an opening transversely of the recess, through which opening the adjusting ring is accessible for adjustment when the insert is fitted. Such an embodiment is shown in FIGS. 3 and 4 in conjunction with a cylindrical housing.

The new boring bar insert functions as follows:

In the embodiment example shown in FIGS. 1 and 2, the insert is inserted from the front end into the recess 19 of the boring bar 8, so that the centering groove 21 closely embraces the stud 20, and the vertical lateral face of the housing lies against the vertical lateral face 19a of the recess. The insert is clamped fast in the recess by means of the setscrew 22. Owing to production tolerances, it is now possible for the tips of the boring tools 2 to have different distances from the boring bar axis. In such a case, one screw-threaded ring 12 is slackened somewhat and the other screw-threaded ring is tightened, whereby the axial bearings 17 and the adjusting ring 16 are also displaced at the same time with the sleeves 3. After tightening of the second screw-threaded ring, all parts surrounding the boring tool carriers 1 will be clamped axially free from play in the housing 9. At the same time, however, due to the cone surface 13 of the screw-threaded rings 12, the conical end of the collet chuck sleeve is pressed inwardly against the shank 1a, whereby gripping and radially play-free clamping of the boring tool carriers 1 is produced. Owing to the axial bearing, more particularly because this is in the form of an antifriction bearing, the boring tool carriers may be displaced, however, radially outward or inward in the clamped condition by rotation of the adjusting ring. Rotation of the adjusting ring is produced by inserting an actuating pin into the radial holes 24 of the ring, adjustment being substantially facilitated by the previously mentioned scale. Since the boring tool carriers are displaced in the clamped condition, it is no longer necessary to operate any fixing or setscrews after adjustment of the desired machining diameter. The adjusted diameter is no longer altered. In smaller boring rod inserts, an axial plain bearing may be provided, if desired, instead of an antifriction bearing.

FIGS. 3 and 4 show another embodiment example, in which the housing 9' has a cylindrical external form. Since the parts situated within the housing correspond to those in the embodiment example of FIGS. 1 and 2, these parts are not shown again. The housing 9' is arranged in a cylindrical cross bore 19' of the boring bar 8'. Extending transversely of the cross bore 19' is an opening 25, through which the adjusting ring 16 and its radial holes 24 are accessible. The adjusting ring may be adjusted by means of an actuating pin also when the insert has been fitted.

A centering device comprises a centering piece 26 is provided, which is slidably mounted in a bore 27 at right angles to the transverse bore but offset in relation to its axis. The centering piece 26 has a knife edge 28 extending obliquely of the bore 27, by means of which knife edge the centering piece engages a corresponding wedge-shaped groove 29 of the housing 9'. The centering piece 26 is pressed against the housing 9' by a screw 30 whereby the housing is both centered and held fast.

The present invention is not to be limited to the embodiments so far described. For example, for its centering, the housing could also have a movable stop, for example by means of a screw, the collar of which projects over the housing periphery and which is screwed alongside in the housing. The adjusting ring 16 could also be provided on both end faces with fixed studs having counterwise screw threads which would then engage corresponding counterwise screw threads of the boring tool carriers. The boring tools themselves instead of the triangular form shown, could also have a rectangular or hexagonal form, in which case if necessary, especially in small boring inserts, they could also be soldered to the boring tool carrier. Also conceivable, but more expensive from the production standpoint, would be an embodiment, in which the boring tool carrier would have a square shank cross section, and the collet chuck sleeves would be provided internally with a corresponding square cross section.

Referring to FIGS. 5 and 6 of the drawings, at 31 is shown a housing insertable in a recess 32 of the boring bar 33. This housing may have a cylindrical or also a rectangular cross section according to whether the boring bar 33 has a recess with a round or rectangular cross section. By means of a setscrew 34, acting on a flat 35 of the housing, the boring bar insert is held fast against axial movement and is secured against rotation.

The housing 31 has a longitudinal bore 36. In this longitudinal bore, a collet chuck sleeve 37 is axially slidable but nonrotatable. Nonrotatability is effected by means of the screw 38 engaging a longitudinal groove 39 of the collet chuck sleeve. The collet chuck sleeve, at its front end, has a cone 40 and in its front region is provided with a number of longitudinal slits, not shown in the drawing, so that it can be radially deformed. The inner cone 41 of the screw-threaded ring 42, screwed into the front end of the longitudinal bore, cooperates with the cone 40. The screw-threaded ring has two recesses 43 for its actuation. Mounted inside the collet chuck sleeve is the boring tool carrier 44, carrying the boring tool 45 on its front end. A screw-threaded stud 46 is provided on the rear end of the boring tool carrier. Cooperating with this screw-threaded stud 46 is the adjusting nut 47, which has a collar 48. The nut is supported rearwardly on a shoulder 51 of the longitudinal bore 36 by means of an axial ball bearing 49 and a bearing ring 50. Another axial ball bearing 52 is provided between the rear end of the collet chuck sleeve 37 and the collar 48, a bearing ring 53 again being interposed here.

The adjusting nut 47 has a rearwardly prolonged shank 47a, provided with an internal hexagon 54 for insertion of a corresponding spanner. The indexing sleeve 55 is mounted on the shank 47a, and carries a scale 58 on its periphery. The scale cooperates with a zero mark 59 on the housing 31. It is thereby possible to read off exactly the adjustment of the boring tool carrier.

The boring tool carrier itself is slidably guided in the collet chuck sleeve 37, but is secured against rotation.

For this purpose, the collet chuck sleeve has internally two or even more longitudinal grooves 56 engaged by pins 57 let into the shank 44a of the boring tool carrier.

Preferably, the bearing rings 50 and 53 are so constructed that they embrace the balls 49 and 52 from the outside. Spring rings 60 secure the bearing rings on the nut 47 against axial displacement, so that the balls 49 and 52 cannot fall out when the parts are being removed or fitted.

The mode of operation is as follows:

After assembly of the boring bar insert, the screw-threaded ring 42 is tightened until all play in the axial and radial directions is eliminated. In the radial direction, through cooperation of the inner cone 41 of the screw-threaded ring 42 and cone 40 of the collet chuck sleeve, the latter bears against the shank 44a of the boring steel carrier. Radial play is thus eliminated. At the same time, however, the screw-threaded ring 42 also exerts an axial force on the collet chuck sleeve 37. Since the collet chuck sleeve is axially slidable, the total axial play between the bearings 49 and 52 and the collar 48 of the adjusting nut 47 and the shoulder 51 is eliminated. The nut is thus held free from play in the axial direction. Despite the fact that here also there is a certain preliminary stressing, the nut can be comparatively easily rotated for adjusting purposes. If a corresponding spanner is inserted in the internal hexagon 54, the boring tool carrier 44 can be moved both forward and backward by rotation of the nut. It is self-evident that in this case for eliminating any play still present in the screw threads between nut 47 and the screw-threaded stud 46, adjustment should always be carried out so that the boring tool carrier is displaced always in the same direction.

I claim:

1. Boring bar insert comprising two counterwise movable boring tool carriers, the boring tools of which are arranged at oppositely situated ends of the boring tool carriers rotated through 180° to one another, in which, for the counterwise movement and adjustment of the boring tool carriers, there is provided between their mutually facing shank ends, an adjusting ring cooperating with two counterwise screw threads of the boring tool carriers, and a centering device, wherein:
   a. the boring tool carriers have a cylindrical shank and are each nonrotatably guided in a collet chuck sleeve having a cone on its outer end,
   b. both sleeves are slidably but nonrotatably guided in a throughgoing longitudinal bore of a housing insertable in the boring bar,
   c. screw-threaded rings are screwed in on both ends of the longitudinal bore and cooperate by their inner cone with the collet chuck sleeve,
   d. between the inner ends of the collet chuck sleeves and the adjusting ring slidable in the longitudinal bore, effect is provided an axial bearing, on which the collet chuck sleeve is supported by the effect of the axial force produced by the screw-threaded ring,
   e. the centering device is provided between the housing and the boring bar.

2. Boring bar insert according to claim 1, wherein in the region of the adjusting ring, the housing has an opening extending transversely of the axis of the longitudinal bore, and the adjusting ring is provided with a number of radial holes for insertion of an actuating pin.

3. Boring bar insert according to claim 2, wherein the boring bar is provided with a recess for receiving the insert, wherein the boring bar has an opening, transversely of the recess, through which opening the adjusting ring is accessible for adjustment when the insert has been fitted.

4. Boring bar insert according to claim 2, wherein the adjusting ring is provided with an adjustment scale on its periphery.

5. Boring bar insert according to claim 1, wherein the adjusting ring is in the form of a nut having two counterwise internal screw threads engaged by screw-threaded studs connected to the shanks of the boring tool carriers.

6. Boring bar insert according to claim 1, wherein the axial bearing is in the form of an antifriction bearing, a bearing ring being provided between the inner ends of the collet chuck sleeves and the antifriction elements.

7. Boring bar insert according to claim 1, wherein the housing is substantially block-shaped the boring bar has a corresponding front-end open recess, and in the vertical side face of this recess, there is provided a cylindrical centering stud, engaging a corresponding centering groove on the housing.

8. Boring bar insert according to claim 1, wherein the housing is cylindrical, and at its center, transversely of the axis, has a wedge-shaped groove, in that the boring bar has a cylindrical transverse bore for receiving the insert, and a centering piece held by a screw is slidable in a bore at right angles to the transverse bore but offset relative to the axis of the latter, this centering piece having a knife edge, cooperating with the groove and extending obliquely of the axis of the bore.